Aug. 1, 1939.　　L. H. MESSINGER, JR　　2,168,232
MOTOR VEHICLE CONTROL
Filed March 26, 1935　　4 Sheets-Sheet 1

INVENTOR
LESTER H. MESSINGER Jr
BY John A. Hanrahan
ATTORNEY

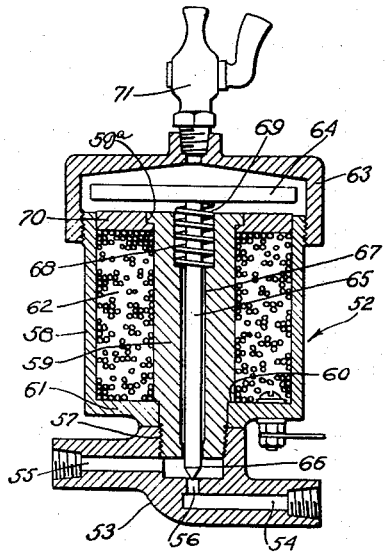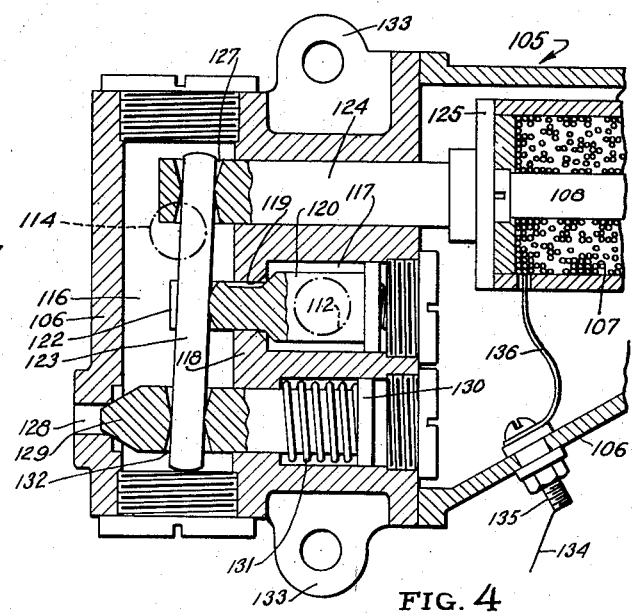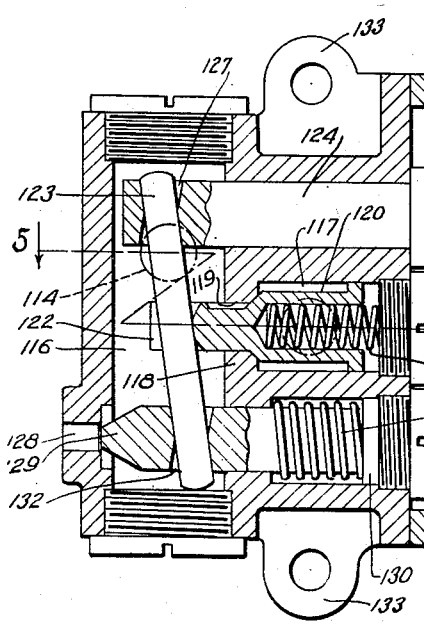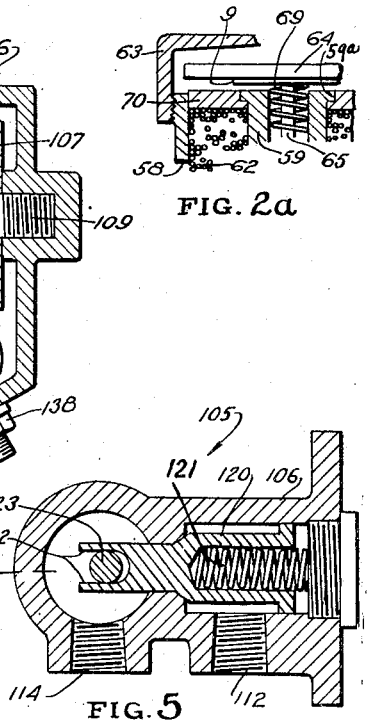

Aug. 1, 1939.   L. H. MESSINGER, JR   2,168,232
MOTOR VEHICLE CONTROL
Filed March 26, 1935   4 Sheets-Sheet 3
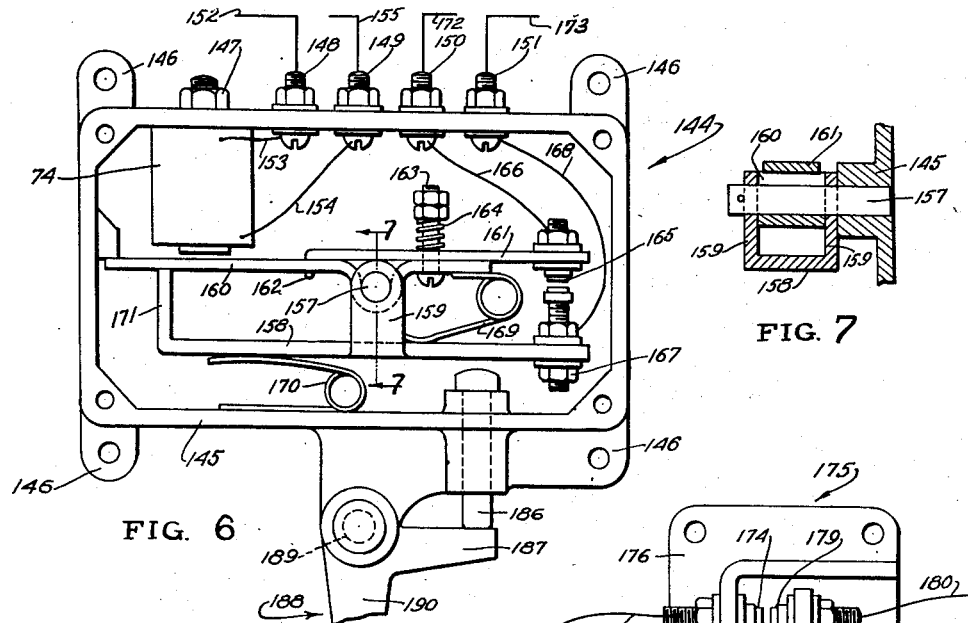
FIG. 6
FIG. 7
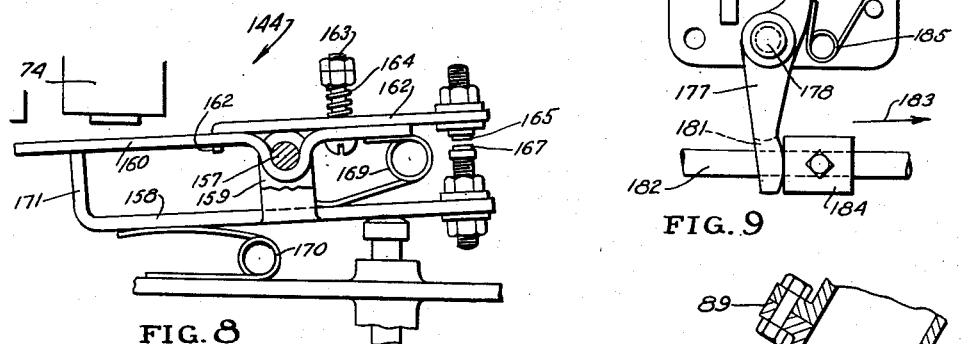
FIG. 8
FIG. 9
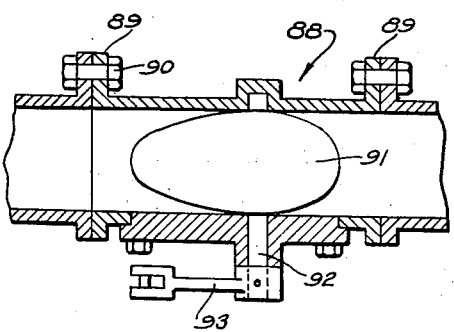
FIG. 10
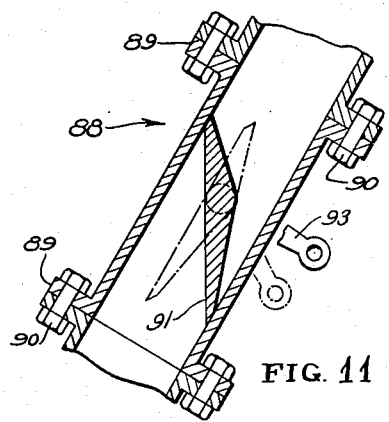
FIG. 11
INVENTOR
LESTER H. MESSINGER Jr
BY John J Hanrahan
ATTORNEY Aug. 1, 1939.    L. H. MESSINGER, JR    2,168,232
MOTOR VEHICLE CONTROL
Filed March 26, 1935    4 Sheets-Sheet 4
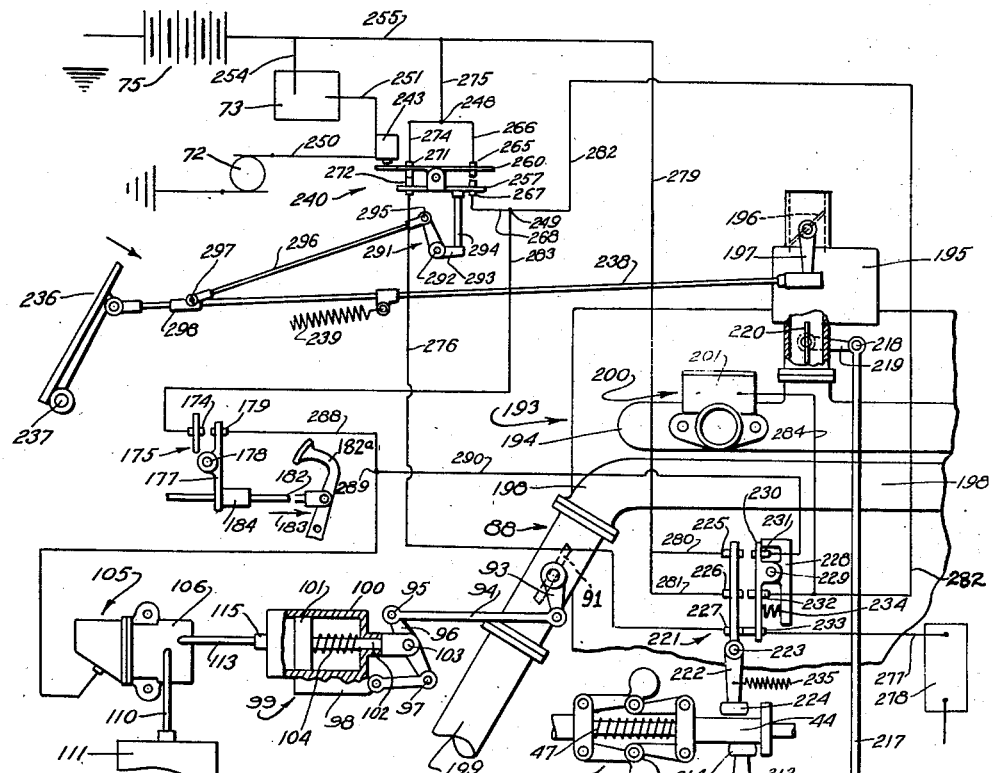
FIG. 12
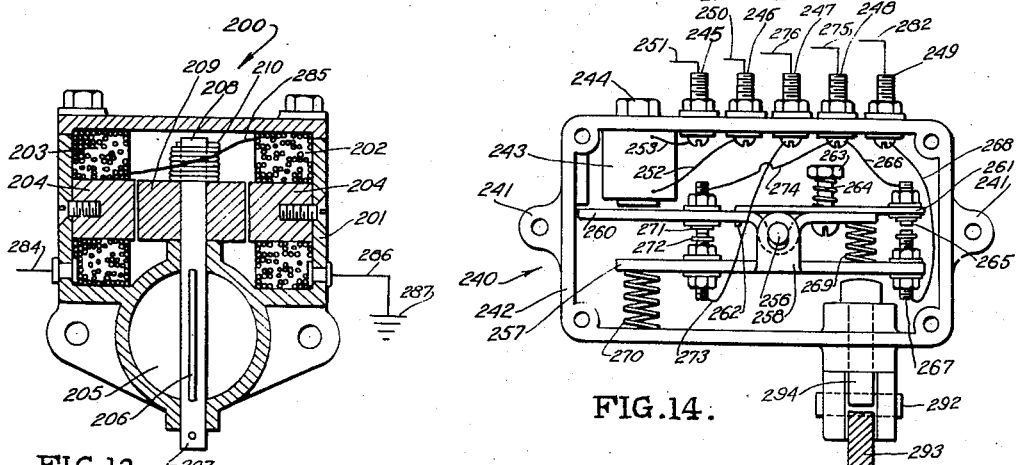
FIG.13.
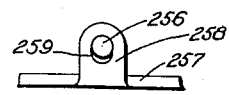
FIG. 15.
FIG.14.
INVENTOR
LESTER H. MESSINGER Jr.
BY
John A Hanrahan
ATTORNEY Patented Aug. 1, 1939

2,168,232

UNITED STATES PATENT OFFICE 2,168,232

MOTOR VEHICLE CONTROL

Lester H. Messinger, Jr., Trumbull, Conn., assignor to Messinger Devices, Incorporated, Bridgeport, Conn., a corporation of Connecticut Application March 26, 1935, Serial No. 13,019

27 Claims. (Cl. 192—3)

This invention relates to new and useful improvements in internal combustion engines and particularly to the engines of motor vehicles.

The invention provides for the automatic slowing up of the engine and the vehicle equipped with the engine when the engine speed exceeds a predetermined maximum; for the stopping or at least lessening of the feed of fuel to the engine when the engine is operating above idling speed with retarded accelerator; and for the applying of a retarding effort to the engine and through the latter to its vehicle, on initial movement of the brake lever toward brake applying position, independent of the vehicle brakes, when the accelerator is retarded while the engine is above idling speed.

The above and other features of the invention will be made clear by a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 2 is a vertical sectional view through a fuel cut-off valve employed;

Fig. 2a is a sectional detail view showing a slight modification of the valve of Fig. 2;

Fig. 3 is a sectional view through an electric air valve and showing the parts in their normal positions;

Fig. 4 is a view similar to Fig. 3 but showing the air valve open;

Fig. 5 is a sectional view taken substantially along the plane of the line 5—5 of Fig. 3.

Fig. 6 is an elevational view of an accelerator operated switch means employed;

Fig. 7 is a detail sectional view taken substantially along the line 7—7 of Fig. 6;

Fig. 8 is an elevational view showing the movable parts of the switching means of Fig. 6 in the positions occupied by them when the engine is idling or is not operating;

Fig. 9 is an enlarged elevational view showing a brake operated switch employed;

Fig. 10 is a horizontal sectional view, on an enlarged scale, through a portion of the engine exhaust line and showing therein a valve in open position;

Fig. 11 is a vertical sectional view through the exhaust line portion of Fig. 10 but with the valve closed;

Fig. 12 is a view similar to Fig. 1 but showing the application of the invention to a gasoline engine;

Fig. 13 is a sectional view showing an air inlet valve, a switching means and details of a circuit of Fig. 12;

Fig. 14 is a view showing a switch means employed; and

Fig. 15 illustrates a detail of construction.

Figure 1:
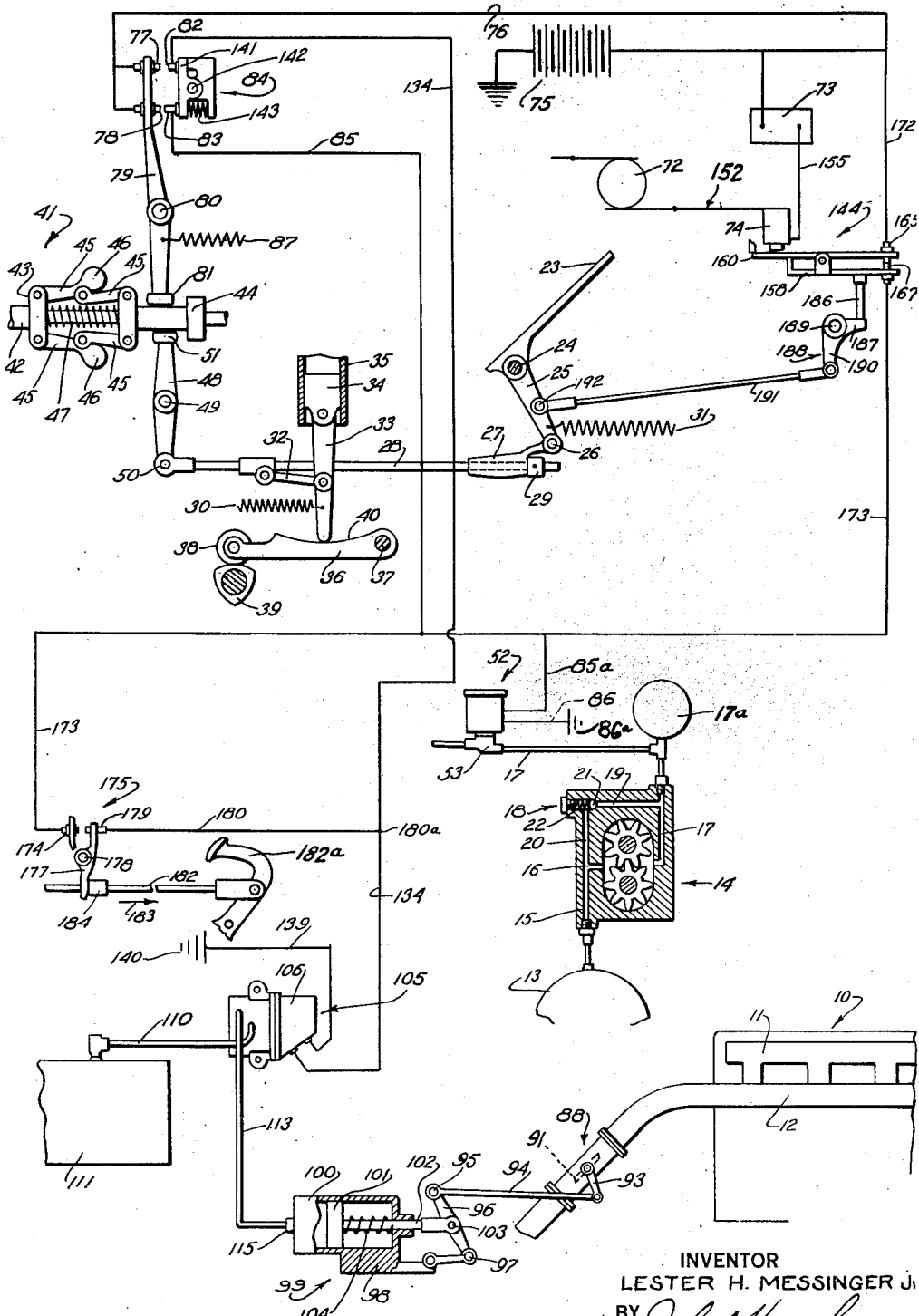
Fig. 1 is a diagrammatic view showing the electrical connections between the various parts.

Referring in detail to the drawings and first particularly to Figs. 1 through 11, at 10 is indicated a Diesel engine of an automobile and while such engine may be of any desired construction it is shown as including an air inlet manifold 11 and an exhaust manifold 12. Fuel for the engine 10 is taken from a fuel tank 13 by means of a suitable pump as, for example, the gear pump 14. When the pump 14 is working it draws fuel through the line 15 and into the pump through a connection 16 and the pump discharges the fuel into a line 17 which through any suitable distributing means (not shown) supplies the fuel to the various cylinders of the engine. Preferably an air dome 17a is connected with the line 17 to maintain a continuous steady flow of fuel therethrough.

A by-pass generally designated 18 is arranged between the line 17 and the intake side of the pump 14 and includes connections 19 and 20 with the line 17 and the intake 16 of the pump respectively. A one-way valve including a ball 21 and a spring 22 constantly tending to hold said ball seated is interposed between the connections 19 and 20. With this arrangement it will be apparent that when the oil pressure in the line 17 exceeds a predetermined value the ball 21 will be unseated against the action of the spring 22 and the fuel will be by-passed around the pump. The quantity of fuel fed to the engine determines its speed and ordinarily in the present case the quantity of fuel fed to the engine is determined by the position of the accelerator 23 pivotally mounted on a bar 24 and carrying an arm 25 pivotally connected at 26 with a coupling member 27.

Slidable through such coupling member is a link 28 connected to shift a piston rod 33 the position of which controls the amount of fuel being fed to the engine 10. A collar 29 normally abutting the member 27 limits movement of the link 28 under the influence of a spring 30 connected at one end with the piston rod 33. A separate spring 31 operates to return the accelerator 23 and the parts associated therewith to retarded position when the accelerator is released. To advance the accelerator or to increase the engine speed the accelerator is rocked downwardly and this movement results in coupling 27 being shifted toward the left in Fig. 1 so that the link 28 may be shifted by the spring 30 and the more the accelerator 23 is rocked downwardly the greater the distance said spring, acting through link 28, shifts the piston rod 33 and the greater the quantity of fuel fed to the engine.

This is due to the fact that by means of a short link 32 the link 28 is connected with the piston rod 33. Such piston rod is connected with a piston 34 operating in a cylinder 35. The outer end of the piston rod engages the curved edge 40 of an arm 36 pivoted at 37 and at its other end carrying a roller 38 bearing on a cam 39. As the cam 39 rotates it rocks the arm 36 on its pivot and causes movement of the piston 34 in the cylinder 35 so as to pump or discharge fuel from the cylinder. Each stroke of the piston 34 represents the discharge from the cylinder 35 of a charge for a cylinder of the engine 10. Obviously the longer the stroke imparted to the piston the greater the charge of fuel. The length of the stroke imparted to the piston is determined by the point of engagement of the outer end of the piston rod 33 with the curved surface 40 of the arm 36.

It will now be understood that the more the accelerator is depressed the farther the spring 30 may draw the piston rod 33 toward the left and the longer the stroke which will be imparted to the piston 34 and accordingly the greater the amount of fuel fed to the engine. As the accelerator is released the spring 31 returns it to retarded position and the member 27 engaging the collar 29 the link 28 is drawn toward the right against the action of spring 30 and the link being connected with the piston rod 33 by the short link 32, the said piston rod is shifted to such position that while the accelerator is in retarded position the engine is fed only that quantity of fuel required to maintain it at idling speed.

The above description relates to the operation of internal combustion engines and particularly Diesel engines as at present used and in Figs. 1 through 11 of the drawing the application of my invention to such engine is illustrated. It will be understood that when but one piston and cylinder 34, 35 is employed a distributor to the various cylinders of the engine is used and that a separate piston and cylinder 34, 35 may be provided for each engine cylinder so that no other distributor is needed. However, the present invention is not limited to any particular feed to the separate engine cylinders.

It is usual in this type of engine to equip the same with means operative when the engine reaches a predetermined maximum speed to limit the feed of fuel to the engine to that amount required for driving the engine at such speed. For this purpose the engine is equipped with a governor generally designated 41 and including a shaft 42 driven in accordance with the engine speed.

Fixed to the shaft 42 is a collar 43 and slidable on such shaft is a collar 44, links 45 being pivoted at their outer ends to such collars and at their adjacent ends to one another and weighted at 46. A coil spring 47 about the shaft 42 normally maintains the collars 43 and 44 spaced. Obviously as the shaft 42 is rotated the weights 46 are flung outwardly by centrifugal force and the links 45 rock about their pivots and the collar 44 is drawn toward the collar 43 against the action of spring 47 which spring forces the collars apart as the speed of rotation of the governor decreases.

An arm 48 is mounted by a pivot 49 intermediate the ends of the arm and one such end is pivotally connected with the rear end of the link 28 at 50. The other end of the arm carries a roller 51 entering between the flanges of the collar 44. With this construction it will be apparent that as the engine reaches a predetermined speed one flange of the governor collar 44 will engage the roller 51 and the arm 48 will be rocked about its pivot 49 in a direction to force the link 28 toward retarded position against the action of the spring 30.

It will be understood that the governor 41 does not interfere with the delivery of a full charge of fuel to an engine cylinder when the engine is operating at low speed and only comes into play when the engine reaches a predetermined speed. At such times it acts to reduce the quantity of fuel being fed to the engine and prevents the feeding to the engine of any amount of fuel in excess of that required to maintain the engine at the predetermined maximum speed.

Interposed in the fuel line 17 between the engine 10 and the gear pump 14 is a fuel cut-off valve operative to cut off the supply of fuel to the engine regardless of the usual or manual control means. Such valve is generally designated 52 and is shown in detail in Fig. 2. This valve comprises a coupling 53 having an inlet 54 and an outlet 55 connected through a passage 56 aligned with an internally threaded lateral opening 57 in the coupling. A casing 58 is secured to the coupling as by an iron core 59 threaded into the opening 57 of the coupling and having an annular shoulder 60 bearing against the inner surface of the end wall 61 of the casing. Within the casing about the core 59 is a coil 62.

A top or cover 63 of brass is threaded or otherwise secured on the upper end of the casing 58 and within such cover is a disc 64 of magnetic material secured to the upper end of a stem 65, the lower end 66 of which is shaped so as to have such stem comprise a needle valve. The stem 65 fits loosely through an opening 67 in the core 59 and about such stem at the upper end thereof and bearing against the disc 64 and against the inner wall of a pocket 68 in the core, is a coil spring 69.

Obviously, this coil spring normally acts to maintain the disc 64 and the stem 65 in a retracted or upper position as shown in Fig. 2 and it will likewise be apparent that on the coil 62 being energized the disc 64 will be attracted against the action of the spring 67 and the stem 65 will be moved downwardly to seat in and close the passage 56 thus cutting off any further supply of fuel to the engine 10. If desired, the construction may include means whereby the valve only partially cuts off the fuel supply to the engine such construction being shown in Fig. 2a and later described in detail. A washer 70 of non-magnetic material as brass is disposed on the upper end of the coil 62 to hold the coil in position, a shoulder 59a on the core 59 overlying a portion of said washer for this purpose. A petcock 71 is threaded through the cover 63 and may be used to exhaust air from the interior of the casing 58 as will later more fully appear.

The usual automobile generator is indicated at 72 in Fig. 1 and in the circuit with such generator and any or the usual cut-out 73 is an electromagnet the purpose of which will later be set forth. As usual the cut-out 73 serves to prevent discharge of the automobile battery 75 when the engine 10 is operating at such low speed that the generator 72 is not being driven at charging speed. This is usually just above engine idling speed.

A lead 76 from the battery is connected with a pair of contacts 77 and 78 carried by an arm 79 pivotally mounted intermediate its ends at 80 and having its lower end positioned to be actuated by the governor 41. When the engine is being driven above the predetermined maximum speed at which the governor actuates the lever 48 and link 28 the collar 44 of the governor is shifted along the shaft 42 to such an extent that the collar engages the roller 81 on the lower end of the lever 79 and causes such lever to rock about its pivot 80 to successively bring the contacts 78 and 77 into engagement with contacts 83 and 82 mounted as on a support 84 and fully insulated from one another.

When the contact 78 engages the contact 83 a circuit is closed to a lead 85 connected with the coil 62 of the electric fuel valve 52 by a short branch lead 85a and from the other end of such coil a lead 86 may be carried to a ground 86a. From this it will be understood that when the speed of the engine 10 exceeds the desired maximum for which the governor 41 is set the coil 62 of the electric fuel valve will be energized from the battery 75 and when this occurs the disc 64 and the stem 65 carried thereby will be drawn downwardly against the action of the spring 69 and the passage 56 between the inlet 54 and the outlet 55 of the coupling 53 will be closed or partially closed so that the supply of fuel to the engine will be stopped or reduced.

As soon as the engine speed drops below the maximum for which the governor is set the spring 47 of the governor will have forced the collar 44 toward the right in Fig. 1 and a return spring 87 will act to rock the lever 79 in a direction to carry the contact 78 away from the contact 83 and thus open the circuit to the coil 62 of the valve 52. The spring 69 will then expand and return the fuel valve parts to the positions of Fig. 2 whereby the passage 56 of the valve will be opened so that fuel may pass freely to the engine.

Means are provided to create a back pressure in the engine 10 subsequent to the closing of the electric fuel valve 52 due to the governor 41 being driven above the set speed, should the engine continue to accelerate after the fuel valve 52 is closed. The automatic regulation of the fuel feed by the governor 41 acting on the arm 48 can only control the engine speed when the vehicle equipped with the engine is moving along a level road or up a grade. When the vehicle is descending a grade the wheels of the vehicle may drive the engine irrespective of whether any fuel is being fed to the engine and with the means now to be disclosed should the vehicle wheels drive the engine at increasing speed after the electric fuel valve 52 is closed then a back pressure will be created in the engine and exert a braking effort to cause the engine to slow down.

To provide for the accomplishment of the indicated result a section 88 is connected in and forms part of the exhaust line 12 of the engine 10 and as shown best in Figs. 10 and 11 the section 88 is provided at its respective ends with flanges 89 secured by bolts 90 to corresponding flanges on the adjacent ends of the sections of the exhaust line 12. Within the section 88 there is arranged a valve 91 the stem 92 of which extends to the outer side of the section and to the outer end of such stem there is secured a short arm or lever 93. As suggested in the drawings the valve is movable between a closed position shown by full lines in Fig. 11 and an open position shown by dotted lines in Fig. 11 and also shown in Fig. 10. The details of this valve are more particularly given in my application Serial Number 716,090, filed March 17, 1934.

On the outer or free end of the arm 93 there is pivotally secured one end of a rod or link 94 the other end of which is pivotally secured at 95 to the free or upper end of a lever 96 which lever at its lower end is pivotally secured as at 97 to a base member 98 of a piston and cylinder assembly generally designated 99. The assembly 99 includes a cylinder 100 within which is located a piston 101 the rod 102 of which extends through the rear end of the cylinder and is pivotally connected at 103 with an intermediate portion of the lever 96. A coil spring 104 within the cylinder 100 normally maintains the piston 101 in its innermost position with the lever 96 in the position of Fig. 1 and with the valve 91 open. Obviously, on the piston 101 being forced inwardly against the spring 104 the lever 96 and rod or link 94 will be shifted to rock the valve 91 to the closed position shown in Fig. 11.

According to the present disclosure fluid, as air, under pressure is used to actuate the piston 101 to bring about the closing of the valve 91 and the supplying of fluid to the cylinder 100 for this purpose is controlled by an electric air valve generally designated 105 and shown in detail in Figs. 3, 4 and 5. This valve includes a casing 106 within which is arranged an electromagnet comprising a coil 107 and a core or armature 108 the latter being shown as threaded at 109 into a boss of the casing whereby the entire magnet is mounted in a fixed position in the casing. A pipe line 110 connects the compressed air tank or reservoir 111, which may or may not be part of any of the usual vehicle power braking system, with the inlet 112 of the valve 105 and a pipe line 113 connects the outlet 114 of said valve with the inlet 115 at the forward end of the cylinder 100.

The outlet 114 from the valve 105 is from a chamber 116 in such valve and the inlet 112 communicates with a chamber 117 separated from the chamber 116 by a wall 118 having an opening or port 119 therethrough normally closed by a slidable valve 120 maintained on its seat by a spring 121. The valve 120 extends into the chamber 116 and therein is bifurcated as at 122 to receive an intermediate portion of a rod 123. A magnetic member 124 is arranged in the casing 106 in parallel relation to the valve 120 and such member is adapted for sliding movement and includes a disc or head portion 125 normally spaced from the electro-magnet as by a gap 126. (See Fig. 3). The end of the member 124 opposite to the head 125 extends into the chamber 116 and therein is provided with an opening 127 through which extends one end portion of the rod 123. As shown the opening 127 is tapered or enlarged toward its opposite ends so that the rod may have a rocking movement in such opening.

In one wall of the casing 106 in communication with the chamber 116 is a bleed opening or port 128 which at the proper times is closed by a normally open valve 129. Such valve is slidable through the wall 118 and to one side of said wall is provided with a head 130 and beneath such head and about the valve is a coil spring 131 normally maintaining the valve in the open position of Fig. 3. An opening 132 corresponding with the opening 127 in the member 124 is provided in that end portion of the valve 129 within the chamber 116 and the rod 123 extends through such opening 132. The casing 106 is provided with perforated lugs 133 by means of which the valve 105 may be secured to a convenient portion of the chassis of an automobile.

The contact 82 on the support 84 is connected by a wire 134 with a binding post 135 on the casing 106 and such binding post is by a wire 136 connected with the coil 107 and from the other end of such coil a wire 137 connects with a binding post 138 from which extends a wire 139 to a ground 140. From this it will be seen that when the engine 10 continues to accelerate above a predetermined maximum speed the governor 41 will act to close a circuit through the coil 107 of the electric air valve 105.

Insofar as the governor 41 is concerned the valve 105 is only opened when the engine continues to accelerate after closing of the electric fuel valve 52. This is true since the contacts 82 and 83 are mounted on a member 141 pivoted at 142 to the support 84. A coil spring 143 is interposed between the lower end of member 141 and the support 84 and acts to maintain the upper end of the member against the support. Contact 83 is longer than contact 82 and when the engine continues to accelerate beyond the speed at which the governor regulates the fuel supply the governor rocks the arm 79 to bring the contact 78 into engagement with contact 83 and close a circuit to the electric fuel valve 52 actuating said valve to stop or decrease the flow of fuel to the engine. Should the speed of the engine now increase the arm 79 will be rocked further and contact 78 pressing against contact 83 the member 141 will be rocked about its pivot 142 compressing spring 143. This will advance contact 82 into engagement with contact 77 and a circuit will be closed to the coil 107 of the electric air valve 105.

Fig. 3 shows the parts of the electric air valve 105 in their normal positions and in such figure it will be noted that the valve 120 is seated closing off communication between the chambers 116 and 117 and accordingly closing off communication between the inlet 112 and the outlet 114. Attention is also directed to the fact that the bleed port 128 is open so that there will be no air under pressure in the cylinder 100 and so that the spring 104 may maintain the piston 101 in normal position with the exhaust line shut-off valve 91 open.

When the coil 107 is energized the magnetic member 124 is attracted and the parts are shifted to the positions in which they are shown in Fig. 4. Initial movement of the member 124 causes the bar 123 to fulcrum against the bifurcated end of the valve 120 and to shift the valve 129 into position closing the port 128. Continued movement of the member 124, after the valve 129 seats, results in the bar 123 pushing the valve 120 inwardly off its seat to permit the movement of compressed air from the chamber 117 into the chamber 116 and through the outlet 114 and pipe 113 to the inlet 115 of the cylinder 100.

With the parts of the valve 105 positioned as in Fig. 4 it will be apparent that air under pressure from the reservoir 111 will be supplied to the cylinder 100 and the piston 101 in said cylinder will be forced inwardly compressing the spring 104 rocking the lever 96 and shifting the connecting rod 94 to cause the valve 91 to close. When the valve is closed the exhaust line of the engine is closed and a back pressure will be created in the engine preventing its acceleration. Therefore, if the engine is coupled with the wheels of a vehicle by any of the usual clutch means the rate of travel of the vehicle will be lowered.

It will now be understood that with the disclosed mechanism on the engine 10 running above a predetermined maximum speed the governor 41 will operate to bring about a closing of a circuit to the electric fuel valve 52 so that the supply of fuel to the engine will be cut off or at least greatly reduced by the valve 52. Further, if the engine continues to gain speed the governor will cause closing of a circuit to valve 105 and compressed air will be supplied to the cylinder 100 to actuate piston 101 and thereby the valve 91 and the exhaust line of the engine will be blocked creating a back pressure in the engine. Therefore, the operator may not operate the engine of the vehicle above the safe maximum speed determined by the setting of the governor 41.

Means are also provided to cause the electric fuel valve 52 and the electric air valve 105 to function at predetermined times when the engine is not operating above the predetermined maximum controlled by the governor 41. This means includes a switch generally designated 144 and of which the electro-magnet 74 above referred to forms part and which switch is shown in detail in Figs. 6, 7 and 8. Such switch means may be conveniently mounted on the automobile and includes a housing 145 having perforated ears 146 by means of which it may be mounted and the electro-magnet 74 is secured to one wall of said housing as by a nut 147. Binding posts 148, 149, 150 and 151 are also mounted on such wall of the housing and wire 152 from the generator 72 connects with the binding post 148 and a wire 153 connects such binding post with the coil of the magnet 74 while a wire 154 connects the other end of said coil with the binding post 149 to which is connected a wire 155 leading to the cut-out 73.

Within the housing 145 is a short shaft 157 on which is pivotally mounted a plate-like member 158 having up-turned ears 159 pivotally mounting the member on the shaft. Also, pivotally mounted on the same shaft is an armature 160 off-set intermediate its ends and having such off-set portion embracing the shaft 157 between the ears 159. A member 161 has its end 162 passed downwardly through a slot in the armature 160 and extends over the shaft 157 and beyond one end of the armature. A bolt 163 passes through the member 161 and the said end portion of the armature and a spring 164 normally tends to keep said member against the armature but permits these parts to be pressed apart in spaced relation to the downturned end 162 of said member.

A contact 165 is carried by the member 161 and is connected with the binding post 150 by a wire 166. Member 158 carries a contact member 167 connected with the binding post 151 by a wire 168. The member 158 and the armature 160 are mounted for movement together and relatively about the shaft 157. A spring 169 normally tends to move the members 158 and 160 apart and so keep the contacts 165 and 167 separated. A spring 170 serves to return such members to normal positions at certain times as will later appear.

The member 158 has an end 171 bent to extend upwardly to the under-side of the armature 160 so as to positively limit the extent to which said members may move relatively in a direction separating the contacts 165 and 167. A wire 172 connects the binding post 150 with the lead 76 from the battery while the wire 85 from the contact 83 is connected with the binding post 151 by a wire 173 which also leads to a contact 174 of a brake operated switch generally designated 175 and now to be fully described.

The particular construction of the switch 175 is not important but it must be arranged to close or to be closed on initial movement of the vehicle brake lever toward brake applying position, much in the manner of the usual stop light switch. Fig. 9 on an enlarged scale shows the switch structure and the same includes a suitable support 176 which may be secured to the vehicle at a convenient location and mounted on said support is the contact 174 shown as being fixed against movement. Also, mounted on said support is an arm or lever 177 pivoted as at 178 and opposite the contact 174 carrying a contact 179 to which is connected a wire 180 connected at 180a with the wire 134.

In its lower end the lever 177 has an opening 181 through which extends a slidable brake rod 182 adapted to be moved as by a brake pedal or lever 182a in the direction of the arrow 183 to bring about application of the vehicle brakes. On this rod is a collar 184 which is against the lower end of the lever 177 when the vehicle brakes are normal or not applied and such collar serves to hold the lever 177 in position with the contact 179 spaced from the contact 174 under such circumstances. A spring 185 normally tends to rock the lever 177 in a direction to bring the contact 179 into engagement with the contact 174. From this it will be apparent that on initial movement of the lever 182a and the rod 182 in the direction of the arrow 183 the collar 184 will be carried away from the lower end of the lever 177 and that the spring 185 will rock such lever about its pivot in a direction to carry the contact 179 into engagement with the contact 174.

It will now be clear that on closing of the contacts 165 and 167 a circuit will be established to the electric fuel valve 52. A push rod 186 extends through the switch housing 145 in position beneath the member 158 of the switch 144. The lower end of such push rod rests on an arm 187 of a bell crank 188 pivotally mounted at 189 and the other arm 190 of such crank has its lower end pivotally connected with a rod 191 and the other end of such rod is pivotally connected at 192 with the accelerator arm 25.

When the magnet 74 is not energized (i. e. when the generator 72 is not being operated at charging speed while the engine is idling) the switch assembly 144 may rock about the shaft 157 from the position of Fig. 6 to that of Fig. 8 by the push rod. When the push rod is again pemitted to move out of the switch housing on the accelerator being advanced the spring 170 returns the parts to their normal positions as shown in Fig. 6. However, when the magnet 74 is energized the switch means is held in the position of Fig. 6 and while it is in such position should the accelerator 23 (Fig. 1) be released it will be moved to retarded position due to the spring 31 and as it moves motion will be imparted to the rod 191 and the bell crank 188 will be rocked about its pivot 189 in a direction to have its arm 187 force the push rod 186 upwardly in the housing 145 (Fig. 6). The push rod will engage the member 158 and force it upwardly against the action of the spring 169 to bring the contact 167 into engagement with the contact 165 and thus close a circuit to the electric fuel valve 52.

This will result in a cutting off of the supply of fuel to the engine if such valve is arranged to have its stem 65 completely close the passage 56 or in reducing the quantity of fuel fed to the determined amount. When the accelerator is retarded if the engine is only operating at idling speed the magnet 74 will not be energized to maintain the switch parts in the position of Fig. 6 and the entire assembly will be rocked about the shaft 157 to the position of Fig. 8 and the contact 167 will not be brought into engagement with the contact 165. Should these contacts at any time be brought into engagement with an excessive pressure the member 161 may yield upwardly compressing the spring 164 so that there need be no breakage or bending of the parts.

It should be understood that the contact 167 is only brought into engagement with the contact 165 on retarding of the accelerator while the engine 10 is operating above an iding speed and/or above the generator cut out point as, for example, when the vehicle is driving the engine. When the engine is not operating or when the engine is operating only at idling speed and/or below the generator cut out point the magnet 74 will not be energized so that as the crank 188 causes movement of the push rod 186 into the housing 145 the push rod will engage the member 158 and rock the entire switch mechanism to the position of Fig. 8. Therefore, it will be clear that the present means is inoperative while the engine is operating only at idling speed and/or below the generator cut out point and does not in any way interfere with the normal idling of the engine.

Assuming that the contacts 165 and 167 (Figs. 1, 6 and 8) are in engagement the valve 52 will be closed cutting off or reducing the supply of fuel to the engine. Should the brake lever now be moved in a direction to apply the vehicle brakes the shifting of the rod 182 will result in closing of the switch 175. This will result in the closing of a circuit to the electric air valve 105 with the result that the coil 107 of said valve will be energized and the valve will open to permit the passage of compressed air from tank 111 to the cylinder 100. Therefore, valve 91 in the exhaust line will be closed to build up a back pressure in the engine 10. With this arrangement the speed of the vehicle may be lowered by placing a drag on the engine and without actually using the friction brakes of the vehicle.

From the foregoing it should be understood that the means of the present invention is readily adapted for attachment to or installation on existing motor vehicles and that the means of the invention may also be built into autmobiles as standard equipment. The electric fuel valve 52 may be used to cut off the supply of fuel to a Diesel or combustion ignition engine and in such case the valve is preferably located as shown or the valve may be entered in the gasoline line of a gasoline engine.

When the present device is in use should the operator attempt to run the engine above the predetermined maximum speed for which the governor 41 is set then a circuit will be closed to the valve 52 and the arrangement may be such that this valve is closed tightly to absolutely cut off the supply of fuel to the engine or the valve may be left slightly open so that a very small quantity of fuel may pass to the engine. Under some circumstances it may be found advisable not to completely cut off the supply of fuel and in such case the valve 52 will be constructed to only substantially close when its coil is energized. This may be accomplished by placing a non-magnetic shim 9 on the lower side of the armature 64 as shown in Fig. 2a.

When the engine continues to gain speed above the maximum speed desired the arrangement disclosed is such that in addition to the fuel supply being cut-off or materially reduced the valve 91 is operated to close the exhaust line so that a back pressure is created in the engine. In this connection it is to be understood that in the Diesel engine a full charge of air is taken into the engine while the latter is operating irrespective of the position of the accelerator. That is, in these engines the accelerator controls only the charge of fuel oil and does not control the air charge. Therefore, when the fuel supply is cut off the engine is pumping only air and when the valve 91 is closed it is not confining an explosive mixture.

The creating of a back pressure in the engine increases the engine drag therefore tending to slow down the vehicle. In addition to the valves 52 and 91 being automatically operated due to arrangement of the governor 41 it is noted that if the engine is operating above idling speed or above the generator cut out point with the accelerator retarded, as when the vehicle is driving the engine, the contacts 165 and 167 (Figs. 1, 6 and 8) of the switch means 144 will be in engagement since the magnet 74 will be energized and a circuit will thus be closed to the valve 52.

With such an arrangement while the engine is coasting no fuel is drawn into the engine and there is consequently a saving of fuel and in addition the formation of dangerous and obnoxious gases is prevented. At times the last described conditions under which the valve 52 is operated are those existing when it is desired that the vehicle slow down or when it is desired to stop the vehicle. If it is desired to stop the vehicle, as soon as the brake rod 182 is moved in a direction to apply the vehicle brakes the spring 185 operates to close the switch 175 thus completing the circuit to the electric air valve 105 so that it is operated to supply air under pressure to the cylinder 100 whereby to bring about the closing of the exhaust line valve 91.

When coil 107 of the valve 105 is de-energized on the opening of the circuit the springs 121 and 131 (Figs. 3 and 4) operate to return the parts of said valve to their normal positions and this means that the valve 120 seats closing off communication between the ports 112 and 114 of the casing 106 and that the valve 129 is retracted to the position of Fig. 3 so that air from the cylinder 100 may bleed back through the casing 106 and exhaust through the port 128. Should any air become trapped in the valve 52 (Fig. 2) the petcock 71 may be opened and the fuel being forced into said valve any air there will be exhausted through such petcock.

For cautious driving over slippery surfaces drivers frequently work the engine against the brakes of a vehicle. That is, they work both the brake pedal and the accelerator at the same time so that the engine is driving the wheels against the action of the vehicle brakes and in this way skidding is prevented. With the present means the engine may be worked against the brakes since irrespective of the position of the brake rod 182 the circuit to the fuel valve 52 and air valve 105 will be broken on the accelerator 23 being advanced. This is so owing to the fact that on advancing the accelerator the spring 169 may separate the contacts 165 and 167 thus breaking the circuit not only to the fuel cut-off valve 52 but also to the valve 105.

It will now be understood that the valve 52 operates between a position where the supply of fuel to the engine is completely or substantially completely stopped, as by being cut-off, and a position where a maximum fuel charge may be fed to the engine. When the engine is being driven by the vehicle with the fuel supply completely stopped should the engine suddenly be supplied with a maximum charge of fuel a sharp surge or jump will result. However, with the present arrangement the regulating or governing means provided for controlling the size of the fuel charge will limit the charge fed to the engine.

Figs. 12, 13, 14 and 15 illustrate the application of the invention to a motor vehicle driven by a gasoline operated internal combustion engine 193 of any or the usual construction. The engine as shown includes an intake manifold 194 fed by a carburetor 195 controlled by the usual throttle valve 196 to the outer end of the stem of which is secured an operating arm 197 which may be manually shifted to accelerate or retard the engine as will later appear. The engine 193 is also provided with an exhaust manifold 198 from which extends an exhaust line 199 having the section 88 incorporated therein. Such section carries the exhaust line cut-off valve 91 previously described and which valve is to be operated by the cylinder and piston construction 99 in turn controlled by the electric air valve 105 as will be understood.

An air inlet valve generally designated 200 is incorporated in or mounted by the intake manifold 194 and such valve is shown in detail in my application Serial No. 653,255 filed January 24, 1933. The valve includes a casing 201 within which are arranged a pair of coils 202 and 203 each disposed about a core 204. In the lower part of the casing 200 there is an opening or port 205 leading into the manifold 194 and this port is of such size or capacity that when the port is opened air will be admitted to the manifold in large quantities and in fact in such quantities as to completely satisfy the suction of the engine so that fuel will not be drawn into the engine and the supply of fuel to the engine will be stopped.

Normally the port 205 is closed by a valve 206 carried by a stem 207 the upper end portion 208 of which mounts an armature 209 located between the magnetic cores 204. A spring 210 on the upper end portion of the valve stem normally acts to maintain such stem in position with the valve 206 closing the port 205 so that air is not admitted through said port and the engine operates in the usual manner. When current is passed through the coils 202 and 203 it will be apparent that the armature 209 will be attracted and in turning the stem 207 of the valve against the action of the spring 210 will move the valve 206 to the open position of Fig. 13.

Means are provided to close a circuit to the coils 202 and 203 on the engine operating above the predetermined speed for which the governor 41 is set and other means are provided for closing a circuit to said coils on the engine operating above idling speed with retarded accelerator as when the vehicle is driving the engine and both such means will later be fully described. Also, the governor 41 as in Fig. 1 operates when the engine reaches a predetermined maximum speed to limit the feed of fuel to the engine. Therefore, if the engine 193 is being driven above such speed, as when the vehicle is descending a steep grade, the engine will only be fed a limited quantity of fuel. Such fuel governing arrangements are not unusual but it will be apparent that they can only control the speed of the engine when the latter is driving the vehicle and cannot control the engine speed when the latter is being driven by the vehicle.

In Fig. 12 the usual governor operated fuel control means is suggested and as there shown the same includes a bell crank lever 211 pivotally mounted at 212, and having an arm 213 carrying a roller 214 disposed to be engaged by the governor spool 44. The other arm 215 of the bell crank is pivotally connected at 216 with the lower end of a link 217 the upper end of which is pivotally connected at 218 with an arm 219 attached to a butterfly valve 220. Normally the valve 220 is in wide open position as shown and when the engine is operating at low speeds the position of the valve 220 is not changed. The engine drives the governor 41 and as the engine speed increases the governor collar 44 will be drawn toward the left and engaging the roller 214 the bell crank 211 will be rocked to shift the link 217 and the latter operating the arm 219 the valve 220 will be moved toward a closing position limiting the amount of fuel which may be drawn into the engine.

Also mounted to be operated by the governor 41 is a switching means generally designated 221 and comprising an arm 222 pivoted intermediate its ends as at 223 and at its lower end carrying a roller 224 positioned to be engaged by the governor spool 44. On the upper portion of the arm 222 and spaced apart and insulated from one another are three contacts 225, 226 and 227. Opposite the upper portion of the arm 222 is a support 228 and pivoted to said support at 229 is a member 230 carrying spaced and insulated contacts 231, 232 and 233 arranged respectively opposite the contacts 225, 226 and 227 and it is here noted that normally the contacts 227 and 233 are in engagement. A coil spring 234 normally holds the member 230 with its upper end portion against the support 228 but it will be apparent that on the spring 234 being compressed the said member may be rocked about the pivot 229.

On the engine 193 continuing to accelerate after the governor has rocked the bell crank 211 to cause shifting of the valve 220 to a position limiting the supply of fuel to the engine then the governor spool 44 engages the roller 224 and rocks the arm 222 about its pivot against the action of a spring 235. As the arm 222 is rocked its contact 226 is brought into engagement with a contact 232 and the member 230 is rocked about its pivot 229. Since the contact 233 is at a greater distance from the pivot 229 than is the contact 232 this rocking of the member 230 by the contact 226 being forced against the contact 232 causes separation of the contacts 227 and 233 since the latter is moved a greater distance than the contact 232 and the former is moved a less distance than the contact 226, this last being true as the contact 227 is closer to the pivot 223 than is the contact 226. After the contacts 226 and 232 have been engaged and the contacts 227 and 233 separated should the engine continue to accelerate the contacts 225 and 230 will be brought into engagement by the rocking of the lever 222 and the member 230 about their respective pivots.

Any or the usual accelerator 236 is shown pivotally mounted at 237 and by means of a link 238 is connected with the outer end of the arm 197 of the throttle valve 196. Obviously, on the accelerator 236 being depressed the throttle valve 196 will be moved toward open position. On the accelerator being released a spring 239 attached to the link 238 returns the parts to their normal positions and as usual when the parts are in their normal positions the engine will be fed only sufficient fuel to maintain it at idling speed.

A switching mechanism generally designated 240 and shown more particularly in Fig. 14 is conveniently mounted on the vehicle as by having any suitable fastening means passed through perforated lugs 241 formed as part of its casing or housing 242. The usual automobile battery is again designated 75 and is in circuit with the usual generator 72 and cut-out 73 and also in such circuit is an electromagnet 243 corresponding with the magnet 74 of the figures previously described.

Such magnet forms part of the switching means 240 which corresponds to and is very similar to the switching means 144 previously described, and the magnet is secured to one wall of the switching means housing 242 as by a nut 244. Also, on said housing wall are binding posts 245, 246, 247, 248, and 249 and it is noted that the wire 250 from the generator 72 connects with the binding post 246 and that the wire 251 from the binding post 245 connects with the cut-out 73. Wires 252 and 253 connect the binding posts 246 and 245 with the coil of the magnet 243. A short wire 254 is shown as connecting the cut-out 73 with the main lead 255 of the battery 75.

Within the housing 241 is a short shaft 256 on which is pivotally mounted a plate-like member 257 having up-turned ears 258 pivotally mounting the member on the shaft. Particularly by reference to Fig. 15 it will be noted that the ears 258 have enlarged openings 259 through which the shaft 256 passes and the purpose of this specific structure will later be fully set forth. As in the case of the switching means 144 the switching means 240 includes an armature 260 pivotally mounted on the shaft 256 and having an intermediate portion off-set and embracing said shaft between the ears 258. A member 261 has one of its ends 262 passed downwardly through a slot in the armature 260 and extends over the shaft 256 and beyond one end of the armature. A bolt 263 passes through the member 261 and the armature and a spring 264 about said bolt constantly tends to keep the member against the armature but permits these parts to be separated in spaced relation to the downturned end of the member.

A contact 265 carried by the member 261 is connected with the bindng post 248 by a wire 266 and a similar contact 267 carried by the member 257 is connected with the binding post 249 by a wire 268. The member 257 and the armature 260 are mounted for movement together and relatively about the shaft 256. A spring 269 normally tends to move the parts 257 and 260 away from one another so as to maintain the contacts 265 and 267 separated. Another spring 270 serves to return such parts to their normal positions when the accelerator is advanced as will later appear. At the side of the shaft 256 opposite the contacts 265 and 267 the armature 260 and the member 257 carry contacts 271 and 272 respectively. These last two contacts are normally in engagement and a wire 273 connects the binding post 247 with the contact 272 while a wire 274 connects the binding post 248 with the contact 271.

From the battery lead 255 a wire 275 extends to the binding post 248 and from the binding post 247 a lead 276 extends to the contact 227 of the switch 221. From the contact 233 of such switch a lead 277 extends to the usual ignition coil 278. Since normally the contacts 271 and 272 of the switch 240 and the contacts 227 and 233 of the switch 221 are in engagement it will be apparent that under the usual circumstances a circuit is completed between the battery 75 and the ignition coil 278.

A wire 279 from the battery lead 255 has branches 280 and 281 connected with the contacts 225 and 226 respectively. From the contact 232 a wire 282 leads to the binding post 249 and connected with such wire either at said binding post or otherwise is a wire 283 leading to the contact 174 of the switch 175. Off the wire 282 there is also carried a wire 284 to the coil 203 of the air inlet valve 200 and such coil is connected with the coil 202 by the wire 285 and from the coil 202 a wire 286 extends to a ground 287. From the contact 179 of the brake operated switch 175 a wire 288 connects with the coil of the valve 105 in the same manner as the wires 134 and 180 establish a similar connection in Fig. 1. Connected with the wire 288 as at 289 is a wire 290 leading to the contact 231 of the switch 221.

Associated with the switch 240 is a bell crank lever 291 pivoted at 292 and on the arm 293 of such lever there is disposed the lower end of a push rod 294 extending into the switch housing 242. Pivotally connected with the outer end of the other arm of the bell crank lever at 295 is the forward end of a link 296 the rear end of which is pivotally connected at 297 with a coupling 298 secured to the link 238. When the accelerator 236 is advanced the bell crank 291 is rocked about its pivot 292 so that its arm 293 moves downwardly and when this occurs the push rod 294 also moves downwardly or in a direction outwardly of the switch housing 242. On the accelerator being released or retarded the bell crank 291 is rocked in the opposite direction and its arm 293 moves upwardly forcing the push rod 294 into said switch housing.

As the push rod moves into the switch housing it engages the under side of the member 257 and tends to move such member in a direction to bring the contact 267 into engagement with the contact 265. If the magnet 243 is energized it will maintain the armature 260 positioned as in Fig. 14 and if the forward end of the member 257 is moved upwardly the contact 267 will engage the contact 265. Owing to the fact that the openings 259 in the ears of the member 257 are enlarged with respect to the diameter of the shaft 256 initial movement of such member by the push rod 294 will result in the member swinging upwardly with the engagement between the contacts 271 and 282 as a pivot point so as to bring the contact 267 into engagement with the contact 265. After the contact 267 engages the contact 265 and as the member 257 continues to move upwardly the lower edges of the openings 259 will engage the under side of the shaft 256 and further movement of the member 257 will be about such shaft as an axis and will result in movement of the contact 272 downwardly away from the contact 271.

In the normal operation of the vehicle with the accelerator advanced the parts are positioned as in Fig. 12. That is, the magnet 243 is energized, the pairs of contacts 271 and 272 and 227 and 233 are in engagement while the pairs of contacts 265 and 267, 225 and 231, and 226 and 232 are separated. Thus, there is a complete circuit to the ignition coil 278, the air inlet valve 200 is closed, the valve 105 is closed and the valve 91 in the exhaust line is open. When the engine reaches the maximum speed for which its fuel feed governing or regulating means is set the governor 41 actuates the butterfly valve 220 toward closed position so as to limit the quantity of fuel fed to the engine irrespective of the position of the throttle valve 196.

Under these circumstances, if the engine continues to accelerate, as when the vehicle is descending a steep grade and driving the engine, the governor spool 44 will be drawn further toward the left and engaging the roller 224 will rock the arm 222 to carry the contact 226 against the contact 232. When these contacts engage, a circuit is closed from the battery 75 through the magnetic coils of the valve 200 and the armature 209 of said valve is attracted and the valve disc 206 shifted to open the port 205. The circuit between the battery and the air valve 200 is through wire 255 to wire 279 through contacts 226 and 232 through wire 282 to the branch 284 leading to the valve.

When the valve 200 is open, air is admitted to the engine in advance of the carburetor and in such quantities as to completely satisfy the suction of the engine and thus stops the supply of fuel to the engine. Since movement of the lever 222 bringing the contacts 226 and 232 into engagement results in the member 230 being rocked about its pivot it will be apparent that the contact 233 is moved away from the contact 227 and the circuit to the ignition coil 278 is broken immediately after the closing of the circuit to the air inlet valve 200. Unless the ignition circuit is broken as indicated the engine will surge ahead on opening of the air valve 200 and this opening of the ignition circuit as indicated also prevents back-firing.

The contact 232 is somewhat longer than the contact 231 and consequently the contact 226 engages the contact 232 without there being sufficient movement of the parts to bring the contacts 225 and 231 into engagement. However, should the engine continue to gain speed after the closing of the circuit to the air inlet valve 200 the arm 222 will be rocked further about its pivot and the contacts 225 and 231 will engage. When such contacts engage a circuit is closed to the valve 105 and such valve will be opened admitting air from the reservoir 111 to the cylinder 100 so that the piston of said cylinder will be actuated and the exhaust line valve 91 will be closed. The circuit to the valve 105 is battery lead 255 to wire 279, wire 280, contacts 225 and 231, wire 290 to connection 289 and then wire 288 to the binding post 235 of the valve.

From the foregoing it will be appreciated that when the exhaust line valve 91 is moved to closed position large quantities of air are being admitted to the engine through the air inlet valve 200. The closing of the valve 91 will therefore result in the creation of a back pressure in the engine so that a substantial braking effort will be present (the engine being coupled to the wheels of the vehicle in the usual manner) and there will be a slowing down of the engine and the drag of the engine will slow down the vehicle. As the engine slows down the governor spring 47 will shift the governor spool 44 to the right or toward normal position and the spring 235 rocking the arm 222 toward normal position will first cause separation of the contacts 225 and 231. This will mean the de-energizing of the magnet of the valve 105 and the exhausting of the air from the cylinder 100 so that the spring 104 in said cylinder may return the piston 101 to normal position and open the exhaust line valve 91.

Further movement of the arm 222 toward normal position as the governor spool 44 moves toward the right results in the opening of the contacts 226 and 232 and closing of the contacts 227 and 233 to bring about closing of the air inlet valve 200 and the closing of the ignition circuit of the engine. When this last occurs it will be apparent that insofar as the valve 200 is concerned conditions have changed from the point where the flow of fuel to the engine was entirely stopped to a point where the engine might be given a full or maximum charge and thus caused to surge. However, due to the usual fuel governing means the valve 220 is partially closed so that only the maximum charge for a predetermined maximum speed may be taken into the engine. Of course, if the accelerator is retarded only an idling charge will be fed to the engine.

The switching means 240 functions when the engine 193 is operating above a predetermined speed with retarded accelerator. This predetermined speed is preferably the idling speed of the engine and in any event is such that the engine is driving the generator 72 at charging speed so that the electro-magnet 243 is energized. When said magnet is energized if the accelerator is retarded the bell crank 291 will be rocked in such direction that its arm 293 forces the push rod 294 into the switch housing 242. As this occurs the member 257 of the switch mechanism 240 is moved upwardly against the action of the spring 269 and the contact 267 brought into engagement with the contact 265. In this way a circuit is closed to the coils of the valve 200 and such circuit includes the battery lead 255, wire 275, wire 266, contacts 265, and 267, wire 268 to wire 282 and the branch 284 from the wire 282 to the air inlet valve.

As above explained owing to the enlarged openings 259 in the ears of the member 257 the contact 272 is moved away from the contact 271 to break the ignition circuit after the contact 267 has engaged the contact 265 to close the circuit to the air inlet valve 200. When such air inlet valve is open due to the closing of a circuit by engagement of the contacts 267 and 265 the exhaust line valve 91 is not automatically closed but arrangements are provided for the closing of said valve should the vehicle operator desire to lessen the speed of the vehicle.

To accomplish the indicated result the operator moves brake lever 182a and thus the brake rod 182 toward brake applying position. Initial movement of this rod brings about the closing of the valve 91 in the exhaust line so that such valve may be closed to create a back pressure in the engine and thus brake the vehicle without actually having the friction brakes of the vehicle engage. Initial movement of the rod 182 permits the contact 179 of the switch 175 to engage the contact 174. When this occurs, assuming the contacts 265 and 267 to be in engagement, the circuit to the valve 105 will be wire 255, wires 275 and 266, contacts 265 and 267, wire 268, wire 283 to contact 174, contact 179 to wire 288 leading to the valve 105 as above explained. When the circuit is thus closed the valve 105 will be opened so that air may pass from the reservoir 111 to the cylinder 100 as previously set forth.

Immediately on the brake rod 182 being permitted to return to normal position the circuit to the valve 105 will be opened so that the engine exhaust line will be opened due to the action of the spring 104 in the cylinder 100. With the arrangement of Figs. 12 through 15 a vehicle driver may work the engine against the brakes to prevent skidding. This may be accomplished with the present means since irrespective of the position of the brake rod 182 the circuit to the valve 105 will be broken on the accelerator 236 being slightly advanced. This is true since on the accelerator being advanced the bell crank 291 will be rocked on its pivot 292 releasing the push rod 294 so that the spring 269 may separate the contacts 265 and 267 thus breaking the circuit not only to the air inlet valve 200 but also to the valve 105.

It will be understood that in Figs. 1, 6, 7 and 8 and in Figs. 12 and 14 the magnets 74 and 243 respectively will not be energized when the cut outs open, as when the engine reaches idling speed or such low speed that the generator is not charging the battery. When this occurs the push rods will, the accelerators being retarded, force the switch assemblies about their respective shafts 157 and 256 as from the position of Fig. 6 to that of Fig. 8. Thereafter when the accelerators are advanced the push rods move out of the switch housings and the springs 170 and 270 rock the respective switch assemblies back to their normal positions. Thus in either case the advancing of the accelerator renders inactive the special means disclosed for stopping of the feed of fuel to the engine.

Having thus set forth the nature of my invention, what I claim is:

1. In combination, in a motor vehicle including an internal combustion engine, a fuel line to the engine, a pump in the line, and means movable from a wide open to a completely closed position to suddenly close the fuel line at a point between the engine and pump to preclude further passage of fuel from the pump to the engine on the engine reaching a predetermined maximum speed.

2. In combination in a motor vehicle including an internal combustion engine, a compressed air reservoir, a normally open valve in the exhaust line of said engine and movable to and from a position closing said line, a cylinder, a piston, a connection between the piston and said valve, a normally closed air valve, a supply connection between said air valve and said reservoir, an outlet connection between said air valve and one end of said cylinder whereby, on opening said air valve, air under pressure from the reservoir may be supplied to the cylinder to operate said piston and actuate the exhaust line valve to closed position, and speed responsive means driven by said engine automatically operable to open said air valve when the engine reaches a predetermined maximum working speed whereby to supply air under pressure to said cylinder to operate said piston to actuate the exhaust line valve to closed position.

3. In combination in a motor vehicle including an internal combustion engine, a compressed air reservoir, a normally open valve in the exhaust line of said engine and movable to and from a position closing said line, a cylinder, a piston, a connection between the piston and said valve, a normally closed air valve, a supply connection between said air valve and said reservoir, an outlet connection between said air valve and one end of said cylinder whereby, on opening said air valve, air under pressure from the reservoir may be supplied to the cylinder to operate said piston and actuate the valve in the exhaust line to closed position, an electro-magnet operable to open said air valve, and speed responsive means driven by said engine and operable to close a circuit to said magnet on said engine reaching a predetermined maximum working speed.

4. In combination in a motor vehicle including an internal combustion engine, a fuel line to the engine, a pump in said line, a normally wide open valve, and means automatically operable to suddenly close said valve to stop the feed of fuel on the engine reaching a predetermined maximum speed.

5. In combination in a motor vehicle comprising an internal combustion engine including an accelerator, a fuel line to the engine, a pump in said line, means automatically operable to stop the feed of fuel to the engine, and accelerator controlled means controlling said first means whereby the latter is operable only on retarding of the accelerator while the engine is exceeding a predetermined speed.

6. In combination, a motor vehicle including an internal combustion engine equipped with means operative when the engine reaches a predetermined maximum working speed to limit the feed of fuel to the engine, and other means controlled solely by engine speed and operable to stop the flow of fuel to the engine on the vehicle driving the engine at a speed above said predetermined maximum working speed.

7. In combination, a motor vehicle including an internal combustion engine equipped with means operative when the engine reaches a predetermined maximum speed to limit the feed of fuel to the engine, other means controlled solely by engine speed and operable to stop the flow of fuel to the engine on the vehicle driving the engine at a speed above said predetermined maximum speed, and means thereafter operable to cause slowing down of the engine by creating a back pressure therein.

8. In combination in a motor vehicle including an internal combustion engine, means to create a back pressure in the engine on movement of the vehicle brake means lever toward braking position while the engine accelerator is retarded, and means whereby said first means is rendered inoperative on advancing of the engine accelerator.

9. In combination in a motor vehicle including an internal combustion engine, a fuel line to the engine, a pump in said line, means to by-pass around the pump excess fuel fed by the pump, means to automatically close said fuel line between the engine and by-pass when the accelerator is moved to closing position, and means for automatically rendering such means inactive when the engine reaches idling speed.

10. In combination in a motor vehicle including an internal combustion engine, a fuel line to the engine, a pump in said line, means to by-pass around the pump excess fuel fed by the pump, means controlled solely by engine speed and automatically operable to stop the feed of fuel to said engine on the engine reaching a predetermined maximum speed, and means thereafter operable to create a back pressure in the engine.

11. In combination in a motor vehicle including an internal combustion engine, means to stop the feed of fuel to the engine on the latter reaching a predetermined maximum speed, and other means controlled solely by engine speed then automatically operable to create a back pressure in the engine.

12. In combination in a motor vehicle including an internal combustion engine, a compressed air reservoir, a normally open valve in the exhaust line of said engine and movable to and from a position closing said line, a cylinder, a piston, a connection between the piston and said valve, a normally closed air valve, a supply connection between said air valve and said reservoir, an outlet connection between said valve and one end of said cylinder whereby on opening of the valve air under pressure from the reservoir may be supplied to the cylinder to operate said piston and actuate the valve in the exhaust line to closed position, an electro-magnet operable to open said air valve, and means to close a circuit to said magnet on initial movement of the vehicle brake lever toward brake applying position only when the accelerator is retarded.

13. In a motor vehicle including an internal combustion engine, means to stop the flow of fuel to the engine on the latter reaching a predetermined speed with retarded accelerator, other means manually operable to create a back pressure in the engine, and said other means operable only while the feed of fuel to the engine is stopped.

14. In a motor vehicle including an internal combustion engine, means to stop the feed of fuel to the engine on retarding of the accelerator, means thereafter operative to create a back pressure in the engine on initial movement of the vehicle brake lever toward braking position, and means rendering said last means inoperative on advancing of the engine accelerator.

15. In a motor vehicle including an internal combustion engine, means for stopping the flow of fuel to the engine when the accelerator is moved to closing position, an ignition circuit, means operable to open said ignition circuit only subsequent to the stopping of the fuel flow to the engine, and means for automatically rendering both such means inactive when the engine reaches idling speed.

16. In combination in a motor vehicle including an internal combustion engine, means for stopping the flow of fuel to the engine when the accelerator is moved to closing position, an ignition circuit, means operable to open said ignition circuit only subsequent to the stopping of the fuel flow to the engine, and means for automatically rendering both such means inactive on the accelerator being again advanced.

17. In a motor vehicle including an internal combustion engine, means to automatically stop the flow of fuel to the engine on the engine reaching a predetermined maximum speed, an ignition circuit, and means operable only subsequent to the stopping of said fuel flow to open and to maintain said ignition circuit open while the flow of fuel to the engine is stopped by said first mentioned means.

18. In a motor vehicle including an internal combustion engine, means to automatically cut off the flow of fuel to the engine on the latter reaching a predetermined maximum speed, and other means operable only subsequent to said first means and on the engine continuing to gain speed to cause a back pressure in the engine.

19. In a motor vehicle including an internal combustion engine, means to automatically stop the flow of fuel to the engine on the latter reaching a predetermined maximum speed, an ignition circuit, means operable to maintain said ignition circuit open while the flow of fuel to the engine is stopped by the first mentioned means, and other means thereafter operable on the engine continuing to accelerate to cause a back pressure in the engine.

20. In a motor vehicle, an internal combustion engine including an intake manifold and an exhaust manifold, means for supplying fuel to said intake manifold, a port for admitting air to said manifold independent of said means, a normally closed valve in said port, means for opening said port to admit air to the engine independent of said fuel supply means, and means automatically operable only subsequent to the opening of said port and on the engine continuing to gain speed to create a back pressure in the engine by closing its exhaust line.

21. In a motor vehicle, an internal combustion engine including an intake manifold and an exhaust manifold, means for supplying fuel to said intake manifold, a port for admitting air to said manifold, a normally closed valve in said port, means for opening said port to admit air to the engine independent of said fuel supply means, and means operative only after said port is open to close the engine exhaust line on the engine continuing to gain speed.

22. In combination, a motor vehicle including an internal combustion engine, and electrical means automatically operable to stop the feed of fuel to said engine on the latter reaching a predetermined maximum speed, and said means also operable to stop the feed of fuel to the engine on closing of the accelerator while the engine is operating above a predetermined minimum speed.

23. In combination, a motor vehicle including an internal combustion engine, and valve means automatically and instantaneously operable from a fully open to a completely closed position to stop the feed of fuel to the engine on the latter reaching a predetermined maximum speed, and said means also operable to stop the feed of fuel to the engine on closing of the accelerator while the engine is operating above a predetermined minimum speed.

24. In combination in a motor vehicle including an internal combustion engine, means automatically operable to close the exhaust line of the engine and thereby create a back pressure in the engine on the latter reaching a predetermined speed while the engine accelerator is retarded, and means whereby said means is rendered inoperative on advancing of the accelerator.

25. In combination, a motor vehicle comprising an internal combustion engine including an accelerator and an accelerator lever, a valve, electrical means adapted on being energized to actuate said valve to stop the feed of fuel to said engine, means to cause energizing of the electrical means on the engine reaching a predetermined maximum speed, and accelerator lever operated means to cause energizing the valve actuating means on movement of said lever to closed accelerator position while the engine is operating above a predetermined minimum speed.

26. In combination, a motor vehicle comprising an internal combustion engine including a throttle valve and a throttle valve operating lever, means controlled by the position of said lever and made operative thereby only when the engine is operating above a predetermined speed and the lever is moved to throttle valve closing position to stop the flow of fuel to the engine, other means operable to create a back pressure in the engine, and said other means operable only while the feed of fuel to the engine is stopped.

27. In combination, a motor vehicle including an internal combustion engine, a normally open exhaust line from said engine, means movable to close said exhaust line and cause a back pressure in the engine, and means controlled by said engine to automatically move said first means to a position closing said exhaust line on the engine reaching a predetermined maximum speed.

LESTER H. MESSINGER, Jr.